United States Patent [19]

Chen

[11] Patent Number: 5,794,245
[45] Date of Patent: Aug. 11, 1998

[54] GENERIC WRAPPER FOR DECOMPRESSING DOS DRIVER SYS FILES

[75] Inventor: Fetchi Chen, Boca Raton, Fla.

[73] Assignee: International Business Machines Corporation, Armonk, N.Y.

[21] Appl. No.: 573,010

[22] Filed: Dec. 15, 1995

[51] Int. Cl.[6] ................................................. G06F 17/30
[52] U.S. Cl. .................. 707/107; 707/100; 707/102; 1/1; 395/681; 395/684
[58] Field of Search ............................... 395/611, 612, 395/681, 684; 707/101, 102; 1/1

[56] References Cited

U.S. PATENT DOCUMENTS

| | | | |
|---|---|---|---|
| 5,123,098 | 6/1992 | Gunning | 711/2 |
| 5,319,751 | 6/1994 | Garney | 711/115 |
| 5,353,411 | 10/1994 | Nakaosa | 395/651 |
| 5,414,850 | 5/1995 | Whiting | 395/661 |
| 5,459,867 | 10/1995 | Adams | 395/681 |
| 5,481,701 | 1/1996 | Chambers | 707/101 |
| 5,511,195 | 4/1996 | Kennedy | 395/681 |
| 5,598,563 | 1/1997 | Spies | 395/652 |

*Primary Examiner*—Thomas G. Black
*Assistant Examiner*—Diane D. Mizrahi
*Attorney, Agent, or Firm*—Mark S. Walker; Andrew J. Dillon

[57] ABSTRACT

An information processing system including a processor for processing instructions; system memory; system storage, the system storage comprises: an operating system, and a compressed device driver, and a decompressor for decompressing the compressed device driver. The decompressor comprises a generic wrapper that includes: a first code stub for restoring the device driver into its uncompressed state when the device driver is loaded into system memory; a second code stub at the start of the driver body portion for taking control of the system where the driver is decompressed and jumping to the first code stub; and a third code stub for saving the original strategy entry point; and for taking control of the system when the device driver is loaded into system memory of the information processing system.

12 Claims, 3 Drawing Sheets

GENERIC WRAPPER FOR DECOMPRESSING DOS DRIVER SYS FILES

FIELD OF THE INVENTION

The invention disclosed broadly relates to data processing systems and more particularly relates to improvements in operating systems for data processing systems.

BACKGROUND OF THE INVENTION

Computer systems typically use operating system software to manage the system resources. Such operating systems include a kernel comprising the basic functions and a set of device drivers that communicate with the devices coupled to the computer systems. Device drivers interact with other parts of the operating system. An operating system usually contains a basic set of device drivers such as those for a keyboard, fixed and floppy disks, a display, and a printer.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems. Moreover, with the increase in the number of peripherals attachable to computers, there is a corresponding increase in the number of device drivers required. The problem of mass storage space required for operating systems is acute in portable systems having smaller hard disc drives. For example, palmtop computers may use a semiconductor chip memory to store the operating system. Such chip memories are typically limited in the amount of storage available.

To reduce the disk/memory storage used by the program files of an operating system, software products such as PKLITE (a product of PKWARE Inc.) embed the decompressor in the program files (.EXE and .COM) to allow self decompression of those files at program load time, but does not address DOS device driver files such as the .SYS files, which are growing in number because of the proliferation of devices.

SUMMARY OF THE INVENTION

Briefly, in accordance with the invention, an information processing system includes a processor for processing instructions; system memory; system storage, the system storage comprises: an operating system, and a compressed device driver, and a decompressor for decompressing the compressed device driver. The decompressor comprises a generic wrapper that includes: a first code stub for restoring the device driver into its uncompressed state when the device driver is loaded into system memory; a second code stub at the start of the driver body portion for taking control of the system where the driver is decompressed and jumping to the first code stub; and a third code stub for saving the original strategy entry point; and for taking control of the system when the device driver is loaded into system memory of the information processing system.

BRIEF DESCRIPTION OF THE DRAWING(S)

DESCRIPTION OF A PREFERRED EMBODIMENT

Figure 1:
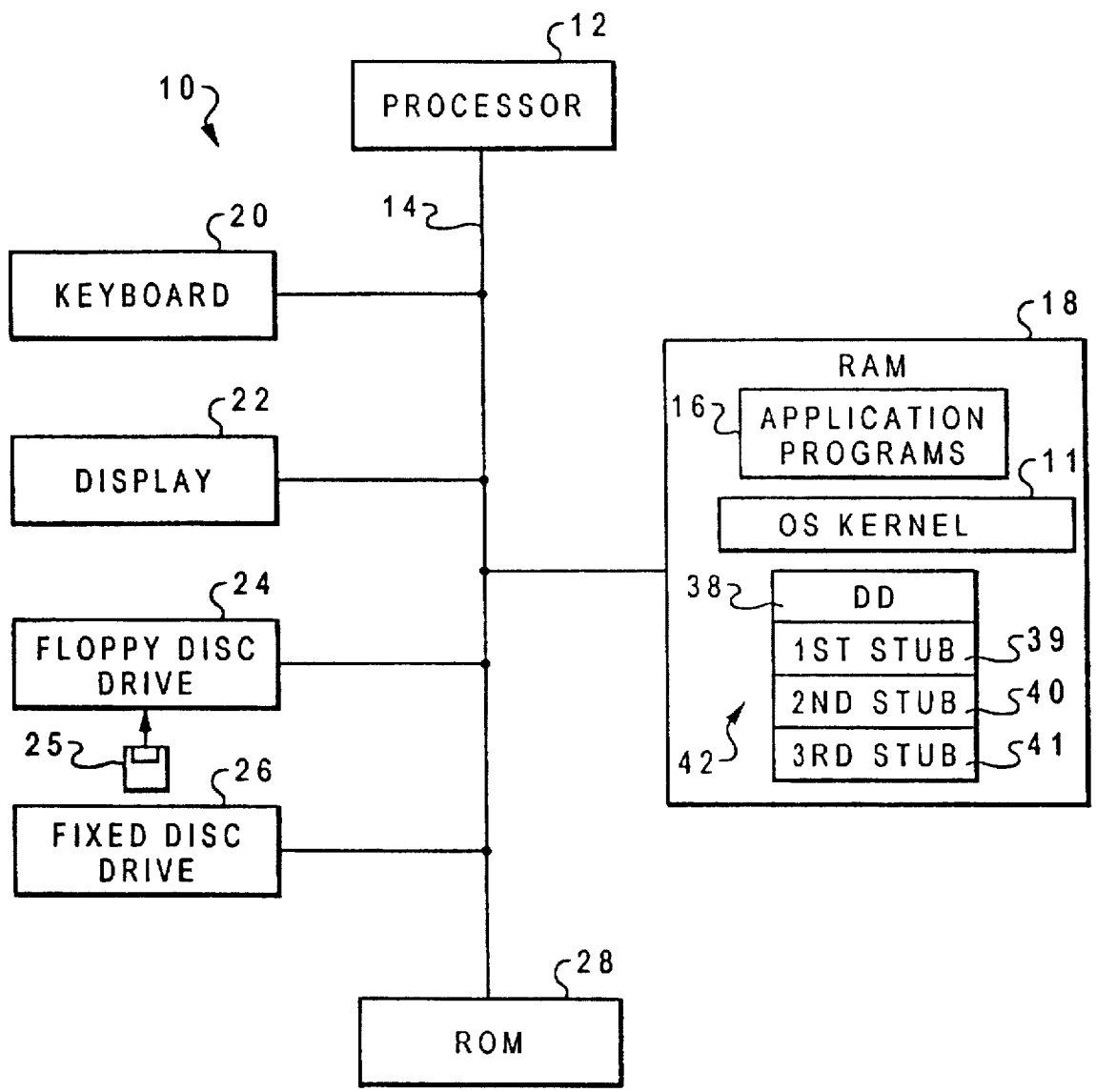
FIG. 1 is a functional block diagram of a computer system in accordance with the invention.

Referring to FIG. 1 there is shown a functional block diagram of a computer system 10 in accordance with the invention. The system 10 includes a system processor 12 (e.g., a Pentium processor produced by Intel Corporation) coupled to a bus 14 which connects to other elements of the system 10. The system 10 further includes a system memory (e.g., a random access memory, or RAM) 18, a keyboard 20, a display 22, a floppy disk drive 24, a fixed disk drive 26, and a read-only memory (ROM) 28. Other elements generally included in computer systems have been omitted for simplicity. The system 10 when programmed in accordance with this invention becomes an apparatus that accomplishes decompression of the device drivers 38 as those drivers are called by the system 10.

The RAM 18 is shown loaded with application programs 16, an operating system kernel 11, and device drivers 38. These programs can be stored in the fixed disk drive 26 or one or more diskettes 25 or ROM 28. The fixed disk drive 26 can be implemented as a drive containing an actual fixed (or rigid) disk in which information is stored magnetically or it can be implemented as a semiconductor chip.

Application programs 16 are stored in RAM 18 for execution by processor 12. The operating system includes a kernel 11 stored in RAM 18 for execution by the processor 12. Also stored in RAM are device drivers 38. In accordance with the invention, the device drivers can be stored in compressed form and decompressed as each driver is loaded into the system's working memory 18. To accomplish this the device driver 38 can be compressed using any appropriate compression software (or hardware) such as PKLITE (distributed by PKWARE) and stored in the fixed disk drive 26 along with a generic wrapper (i.e., a layer of code) 42 that includes first, second, and third code stubs (39, 40, and 41, respectively) for decompressing using the decompression code already present in the memory 18.

Figure 2:
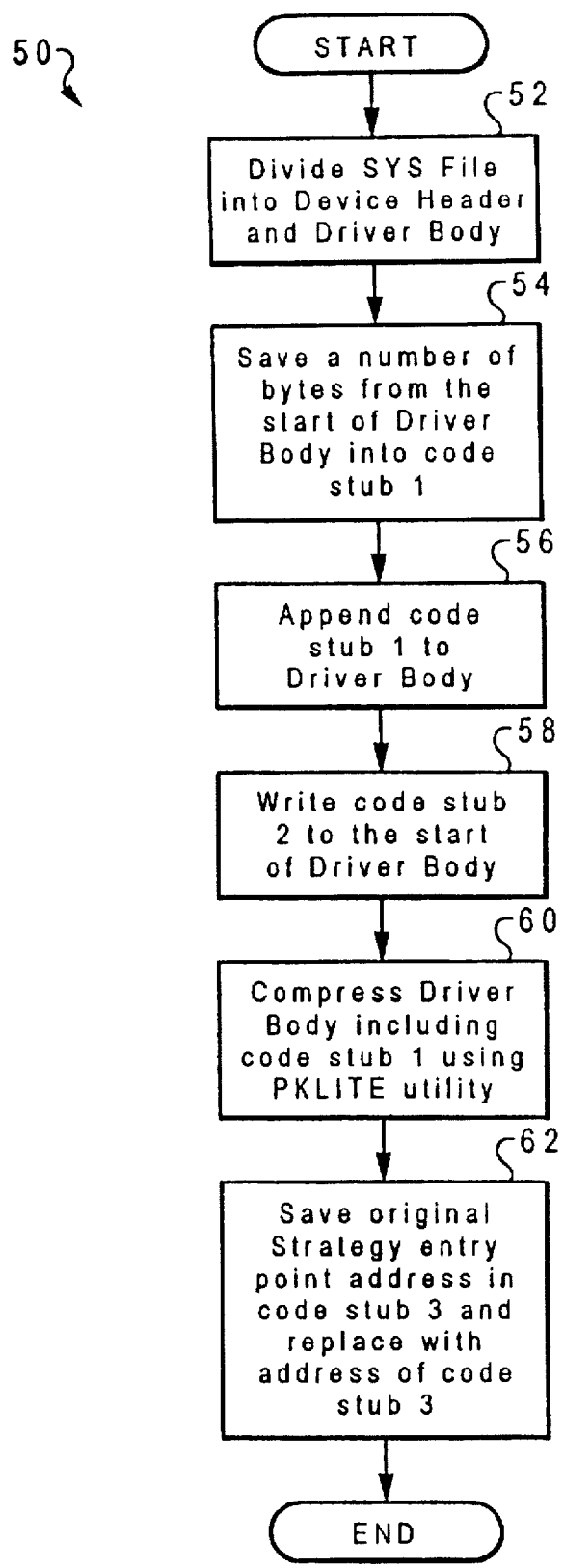
FIG. 2 is a block diagram of a process sequence for compressing DOS SYS files.
Figure 3:
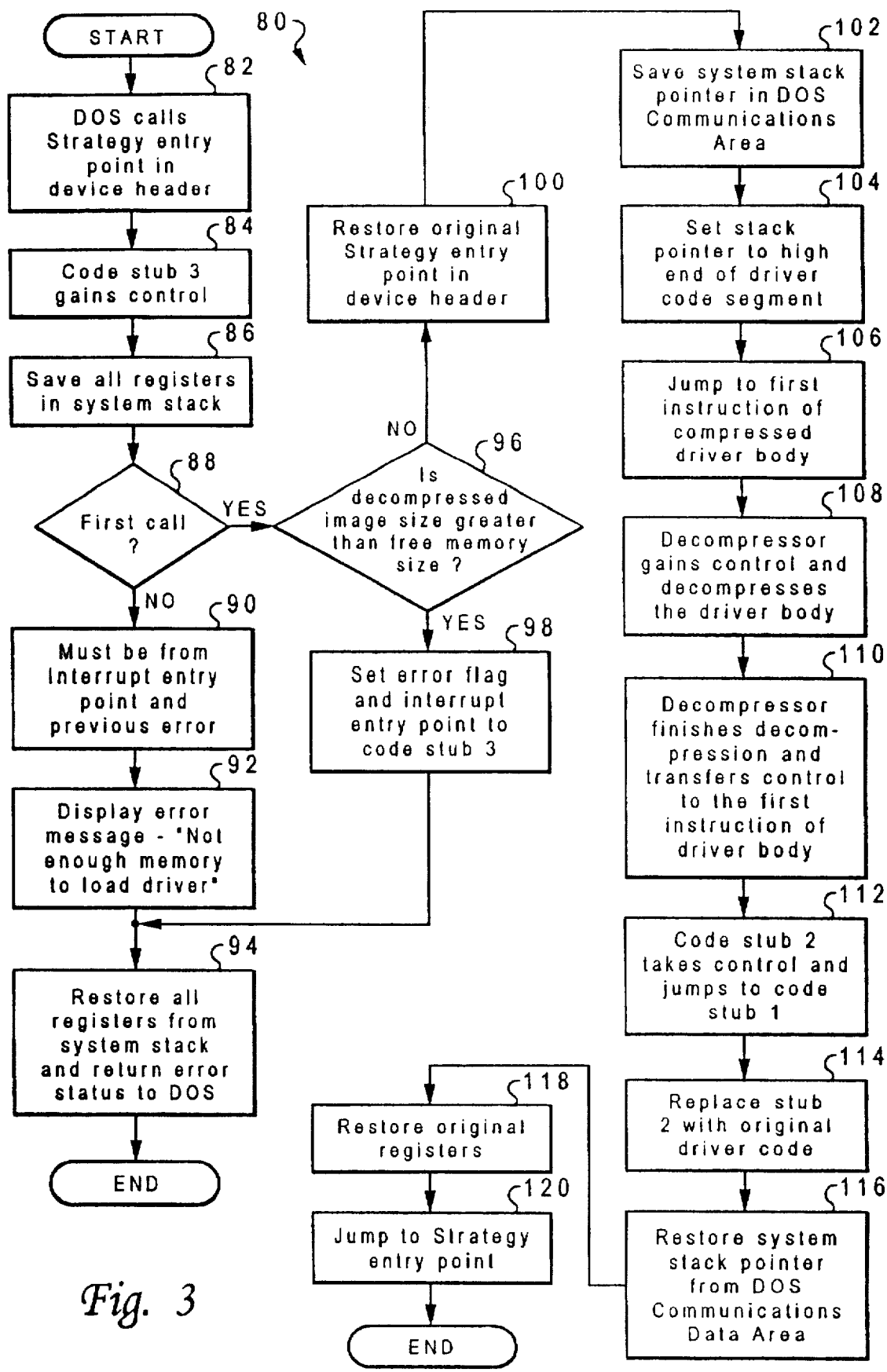
FIG. 3 is a block diagram of a process for loading compressed DOS SYS files.

Referring to FIG. 2, there is shown a flow chart illustrating a method 50 for compressing a driver for storing into a storage resource (e.g., a hard disk drive) of an information processing system. Equivalently, the device driver can be stored in compressed form in any suitable removable storage media such as a diskette (e.g., diskette 25 of FIG. 1), a set of diskettes or a CD ROM. The method comprises the following steps. In step 52 a device driver file is divided into a device header portion and a driver body portion. In step 54, several bytes from the start of the driver body portion are saved into a first code stub, for taking control of the system when the device driver is loaded into system memory of the information processing system. In step 56, the first code stub is appended to the driver body portion. In step 58, a second code stub is written to the start of the driver body portion for restoring the device driver into its uncompressed state when the device driver is loaded into system memory. In step 60, the driver body portion including the first code stub is compressed using a conventional compression utility, such as PKLITE. In step 62, the original strategy entry point address is saved in a third code stub and the original strategy entry point is replaced with the address of the third code stub. Referring to FIG. 3 there is shown a flow chart illustrating a method 80 for converting a compressed device driver including a generic wrapper comprising a first, second, and third code stubs, into a decompressed device driver and loading the decompressed device driver into the system memory (e.g., RAM) of a information processing system. The method comprises the following steps. In step 82, the operating system (e.g., DOS) calls a strategy entry point in a device driver header. In step 84, control of the system is transferred to the third code stub. In step 86, all registers are saved in the system stack. In step 88, it is determined whether the device driver is being called for the first time. If decision 88 is no then the call is for 2nd time, in step 90, the call must be from an Interrupt entry point and due to previous error. In step 92, an error message is displayed, all registers from the system stack are restored, and an error message is returned to the operating system of the information processing system.

When the device driver is being called for the first time the following steps are done. In step 96, it is determined whether the decompressed image of the compressed device driver size is larger than the free memory size. Then in step 98, when the decompressed image of the compressed device driver is larger than the free memory size an error flag is set and an interrupt entry point is replaced with the address of the third code stub and restoring all registers from the system stack, and returning an error message to the operating system of the information processing system.

When the decompressed image of the compressed device driver size is not larger than the free memory size: In step 100 the original strategy entry point is restored in the device driver. In step 102 the system stack pointer is saved in a communication area of the operating system. In step 104 the stack pointer is set to a high end of the device driver code segment. In step 106 the system jumps to the first instruction of the compressed device driver body. In step 108 the decompressor gains control of the SYS and the device driver body is decompressed. In step 110 control is transferred to the first instruction in the device driver body. In step 112 control is transferred to the first instruction of the second code stub and jumps to the first code stub. In step 114 the second code stub is replaced with the original device driver code saved in the first code stub. In step 116 the system stack pointer is restored from the communications data area of the operating system. In step 118 restoring the original registers. In step 120 the system jumps to the strategy entry point of the device driver.

Although a specific embodiment of the invention has been disclosed, it will be understood by those having skill in the art that changes can be made to that specific embodiment without departing from the spirit and scope of the invention.

What is claimed is:

1. A method for converting an uncompressed device driver into a compressed device driver for storing into a storage resource of an information processing system, said method comprising the steps of:

(1) dividing a first device driver file into a device header portion and a driver body portion;
   (2) saving a number of bytes from the start of the driver body portion into a first code stub, for restoring the device driver into its uncompressed state when the device driver is loaded into system memory;
   (3) appending the first code stub to the driver body portion;
   (4) writing a second code stub to the start of the driver body portion for taking control of the system after the device driver is decompressed;
   (5) compressing the driver body portion including the first code stub; and
   (6) saving the original strategy entry point address in a third code stub and replacing the strategy entry point with the address of the third code stub, for taking control of the system when the device driver is loaded into system memory of the information processing system.

2. A method for converting a compressed device driver including a generic wrapper comprising a first, second, and third code stubs, into a decompressed device driver and loading the decompressed device driver into a system memory for an information processing system, said method comprising the steps of:

(1) calling a strategy entry point in a device driver header;
   (2) transferring control of the system to the third code stub;
   (3) saving all registers in a system stack;
   (4) determining whether the device driver is being called at the first time; and
   (5) if the device driver is not being called, displaying an error message, restoring all registers from the system stack, and returning an error message to the operating system of the information processing system.

3. The method of claim 2 further comprising the following steps when the device driver is being called:

(6) determining whether the decompressed image of the compressed device driver size is larger than the free memory size;
   (7) setting an error flag and interrupt entry point to the third code stub when the decompressed image of the compressed device driver size is larger than the free memory size; and restoring all registers from the system stack, and returning an error message to the operating system of the information processing system.

4. The method of claim 3 further comprising the following steps when the decompressed image of the compressed device driver size is not larger than the free memory size:

(8) restoring the original strategy entry point in the device driver from the third code stub;
   (9) saving the system stack pointer in a communication area of the operating system;
   (10) setting the stack pointer to a high end of the device driver code segment;
   (11) jumping to the first instruction of the compressed device driver body;
   (12) the decompressor gains control and decompresses the device driver body;
   (13) transferring control to the first instruction in the device driver body;
   (14) transferring control to the first instruction of the second code stub and jumping to the first code stub;
   (15) replacing the second code stub with the original device driver code saved in the first code stub;
   (16) restoring the system stack pointer from the communications data area of the operating system;
   (17) restoring the original registers; and
   (18) jumping to the strategy entry point of the device driver.

5. The system according to claim 4 further comprising:

means for restoring the original strategy entry point in the device driver from the third code stub if the decompressed image of the compressed device driver size is not larger than the free memory size;
   means for thereafter saving the system stack pointer in a communication area of the operating system;

means for setting a stack pointer to a high end of the device driver code segment;

means for jumping to the first instruction of the compressed driver body;

means for gaining control of the decompressor and decompressing the device driver body;

means for transferring control to the first instruction in the device driver body;

means for transferring control to the first instruction of the second code stub and jumping to the first code stub;

means for placing the second code stub with the original device driver code saved in the first code stub;

means for restoring the system stack pointer from the communications data area of the operating system;

means for restoring the original register; and means for jumping to the strategy entry point of the device driver.

6. A method for converting a device driver into a compressed format, said device driver comprising a device driver header and a deviced driver body, said device driver header having a plurality of entries, said entries of said device driver header for storing a pointer to a next device driver, a field for representing device attributes, a strategy offset address, and an interrupt offset address, said method comprising the steps of:

moving a first code stub from the beginning of said driver body to the end of said driver body;

inserting a second code stub at the beginning of said driver body, wherein said second code stub comprises code for taking control of said driver body after said driver body gas been decompressed;

compressing said driver body, said first and second code stubs;

replacing said strategy offset address with the address of a third code segment, wherein said third code stub comprises code for checking available memory before decompressing a driver body in a compresses format; and storing the contents of said strategy offset address in the third code stub.

7. A method for converting a compressed device driver into an uncompressed format, said compressed device driver comprising a modified device driver header and a compressed driver body; said modified device driver header having plurality of entries, said entries of said modified device driver header for: storing a pointer to a next device driver, a field for representing device attributes, a third code stub, wherein said third code stub comprises code for checking available memory before decompressing said compressed driver body, and an interrupt offset address; said compressed driver body including a first code stub and a second code stub, wherein said second code stub comprises code for taking control of said compressed driver body after said compressed driver body has been decompressed; said method comprising steps of:

checking for available memory;

operative if said step of checking indicates that sufficient memory is available:

restoring said strategy offset address from said third code stub to said modified device driver header;

decompress said compressed said driver body; and replacing said second code stub with original driver code saved in the said first code stub;

operative if said step of checking indicates that sufficient memory is not available:

posting an error message.

8. A system for converting an uncompressed device driver into a compressed device driver for storing into a storage resource of an information processing system, said system comprising:

means for dividing a first device driver file into a device header portion and a driver body portion;

means for saving a number of bytes from the start of the driver body portion into a first code stub and for restoring the device driver into its uncompressed state when the device driver is loaded into system memory;

means for appending the first code stub to the driver body portion;

means for writing a second code stub to the start of the driver body portion for taking control of the system after the device driver is decompressed;

means for compressing the driver body portion including the first code stub; and means for saving the original strategy entry point address in a third code stub and replacing the strategy entry point with the address of the third code stub and for taking control of the system when the device driver is loaded into system memory of the information processing system.

9. A system for converting a compressed device driver into a generic wrapper comprising a first, second and third code stubs, into a decompressed device driver and loading the decompressed device driver into a system memory for an information processing system, subsystem comprising:

means for calling a strategy entry point in a device driver header;

means for transferring control of the system to the third code stub;

means for saving all registers in a system stack;

means for determining whether the device driver is being called at the first time; and means for displaying an error message, restoring all registers from the system stack and returning an error message to the operating system of the information processing system if the device driver is not being called.

10. The system according to claim 9 further comprising:

means for determining whether the decompressed image of the compressed device driver size is larger than the free memory size if the device driver is being called; and means for setting an error flag and interrupt entry point to the third code stub when the decompressed image of the compressed device driver is larger than the free memory size and for restoring all registers from the system stack and returning an error message to the operating system of the information processing system.

11. A system for converting a device driver into a compressed format, said device driver comprising a device driver header and a device driver body, said device driver header having a plurality of entries, said entries of said device driver header for storing a pointer to a next device driver, a field for representing device attributes, a strategy offset address, and an interrupt offset address, said system comprising:

means for moving a first code stub from the beginning of said driver body to the end of said driver body;

means for inserting a second code stub at the beginning of said driver body, wherein said second code stub comprises code for taking control of said driver body after said driver body has been decompressed;

means for compressing said driver body, said first and said second code stubs;

means for replacing said strategy offset address with the address of a third code segment, wherein said third code stub comprises code for checking available memory before decompressing a driver body in a compressed format; and means for storing the contents of said strategy offset address in the third code stub.

12. A system for converting a compressed device driver into an uncompressed format, said compressed device driver comprising a modified device driver header and a compressed driver body; said modified device driver header having a plurality of entries, said entries of said modified device driver header for: storing a pointer to a next device driver, a field for representing device attributes, a third code stub, wherein said third code stub comprises code for checking available memory before decompressing said compressed driver body, and an interrupt offset address; said compressed driver body including a first code stub and a second code stub, wherein said second code stub comprises code for taking control of said compressed driver body after said compressed driver body has been decompressed; said system comprising:

means for checking for available memory;

means for restoring said strategy offset address from said third code stub to said modified device driver header if sufficient memory is available;

means for decompressing said compressed driver body if sufficient memory is available; and means for replacing said second code stub with original driver code saved in said first code stub; and means for posting an error message if sufficient memory is not available.

* * * * *

UNITED STATES PATENT AND TRADEMARK OFFICE
CERTIFICATE OF CORRECTION

PATENT NO. : 5,794,245
DATED : August 11, 1998
INVENTOR(S) : Fetchi Chen

It is certified that error appears in the above-identified patent and that said Letters Patent is hereby corrected as shown below:

In col. 5, line 33, please change "gas" to --has--.

In col. 5, line 40, please change "compresses" to --compressed--.

In col. 5, line 64, please change "decompress" to --decompressing--.

Signed and Sealed this

Ninth Day of March, 1999

Attest:

Q. TODD DICKINSON

Attesting Officer

Acting Commissioner of Patents and Trademarks